US012749362B2

(12) United States Patent
Mukha

(10) Patent No.: US 12,749,362 B2
(45) Date of Patent: Sep. 29, 2026

(54) PHYSICAL ACCESS CONTROL SYSTEM WITH SECURE RELAY

(71) Applicant: ASSA ABLOY AB, Stockholm (SE)

(72) Inventor: Matvey Mukha, Graz (AT)

(73) Assignee: ASSA ABLOY AB, Stockholm (SE)

( * ) Notice: Subject to any disclaimer, the term of this patent is extended or adjusted under 35 U.S.C. 154(b) by 131 days.

(21) Appl. No.: 18/259,133

(22) PCT Filed: Sep. 14, 2021

(86) PCT No.: PCT/EP2021/075234
§ 371 (c)(1),
(2) Date: Jun. 23, 2023

(87) PCT Pub. No.: WO2022/144100
PCT Pub. Date: Jul. 7, 2022

(65) Prior Publication Data

US 2024/0054836 A1 Feb. 15, 2024

Related U.S. Application Data

(60) Provisional application No. 63/132,947, filed on Dec. 31, 2020.

(51) Int. Cl.
*G07C 9/22* (2020.01)
*G07C 9/00* (2020.01)
*G07C 9/27* (2020.01)

(52) U.S. Cl.
CPC ........... *G07C 9/22* (2020.01); *G07C 9/00309* (2013.01); *G07C 9/00571* (2013.01); *G07C 9/27* (2020.01);

(Continued)

(58) Field of Classification Search
CPC ........ G07C 9/22; G07C 9/27; G07C 9/00309; G07C 9/00571; G07C 2009/00412; G07C 2009/00793; G07C 2209/08

(Continued)

(56) References Cited

U.S. PATENT DOCUMENTS 8,774,714 B2 7/2014 Metivier
8,941,465 B2 1/2015 Pineau et al.

(Continued)

FOREIGN PATENT DOCUMENTS

CA 3107526 3/2020
CN 101088247 A 12/2007

(Continued)

OTHER PUBLICATIONS

"Argo and the ISEO Zero1 Access Control Devices", ISEO, (Jun. 11, 2020), 185 pgs.

(Continued)

*Primary Examiner* — Zhen Y Wu
(74) *Attorney, Agent, or Firm* — Schwegman Lundberg & Woessner, P.A.

(57) ABSTRACT

A method of operating an access control system comprises receiving, by a mobile device, an identification of a physical access portal; verifying access credential information stored in the mobile device using a verification application of the mobile device; establishing a secure communication channel with a secure relay device associated with the physical access portal; sending an encrypted access token stored in the mobile device to the secure relay device; and granting access by the secure relay device to the physical access portal according to the encrypted access token.

20 Claims, 6 Drawing Sheets

(52) U.S. Cl.
CPC .............. *G07C 2009/00412* (2013.01); *G07C 2009/00793* (2013.01); *G07C 2209/08* (2013.01)

(58) Field of Classification Search
USPC ........................................................ 340/5.61
See application file for complete search history.

(56) References Cited

U.S. PATENT DOCUMENTS

| | | | |
|---|---|---|---|
| 9,317,985 B2 | 4/2016 | Tehranchi et al. | |
| 9,483,887 B1 | 11/2016 | Soleimani | |
| 9,483,934 B2 | 11/2016 | Kotlicki | |
| 9,501,883 B2 | 11/2016 | Handville et al. | |
| 9,659,424 B2 | 5/2017 | Huber et al. | |
| 9,852,562 B2 | 12/2017 | Belhadia et al. | |
| 10,013,825 B2 | 7/2018 | Belhadia et al. | |
| 10,246,905 B2 | 4/2019 | Al-kahwati et al. | |
| 10,305,895 B2 | 5/2019 | Barry et al. | |
| 10,443,266 B2 | 10/2019 | Johnson et al. | |
| 10,643,461 B2 | 5/2020 | Davis | |
| 10,686,883 B2 | 6/2020 | Dunsbergen et al. | |
| 10,708,410 B2 | 7/2020 | Gerhardt et al. | |
| 10,755,503 B2 | 8/2020 | Shin et al. | |
| 10,755,505 B2 | 8/2020 | Fujiwara et al. | |
| 11,158,144 B2* | 10/2021 | Friedli | G07C 9/38 |
| 11,297,458 B1* | 4/2022 | Abramson | H04W 8/005 |
| 2003/0151493 A1* | 8/2003 | Straumann | G07C 9/00857 340/5.25 |
| 2005/0241003 A1* | 10/2005 | Sweeney | H04W 4/02 726/28 |
| 2007/0025314 A1* | 2/2007 | Gerstenkorn | G07C 9/00182 370/342 |
| 2007/0200665 A1* | 8/2007 | Studerus | G07C 9/27 340/5.5 |
| 2008/0287062 A1* | 11/2008 | Claus | H04W 12/50 455/41.2 |
| 2012/0169461 A1* | 7/2012 | Dubois, Jr. | G07C 9/00309 340/5.2 |
| 2013/0189924 A1* | 7/2013 | Pedro | H04W 4/80 455/41.1 |
| 2013/0214902 A1 | 8/2013 | Pineau et al. | |
| 2014/0095994 A1 | 4/2014 | Kim | |
| 2014/0375422 A1* | 12/2014 | Huber | G07C 9/00571 340/5.61 |
| 2015/0170448 A1 | 6/2015 | Robfogel et al. | |
| 2015/0199859 A1 | 7/2015 | Ouyang et al. | |
| 2016/0036788 A1* | 2/2016 | Conrad | H04W 12/06 713/168 |
| 2016/0050271 A1* | 2/2016 | Tohzaka | H04L 67/1095 709/248 |
| 2016/0155281 A1* | 6/2016 | O'Toole | H04W 12/50 340/5.64 |
| 2016/0239001 A1 | 8/2016 | Chin et al. | |
| 2016/0260271 A1* | 9/2016 | Belhadia | G06F 21/35 |
| 2016/0321647 A1* | 11/2016 | McLaughlin | G07C 9/00309 |
| 2016/0358397 A1* | 12/2016 | Kristensen | G07C 9/00309 |
| 2017/0046107 A1* | 2/2017 | Mihira | H04W 4/80 |
| 2017/0271915 A1* | 9/2017 | Quinn | G06Q 50/06 |
| 2018/0025563 A1 | 1/2018 | Kerning et al. | |
| 2018/0262891 A1* | 9/2018 | Wu | H04W 12/065 |
| 2018/0309741 A1 | 10/2018 | Neafsey et al. | |
| 2018/0310142 A1* | 10/2018 | Samdani | H04L 51/046 |
| 2018/0322759 A1 | 11/2018 | Devdas et al. | |
| 2018/0341393 A1 | 11/2018 | Frenette et al. | |
| 2019/0096148 A1 | 3/2019 | Hopkins et al. | |
| 2019/0122293 A1* | 4/2019 | Minsely | H04L 9/3228 |
| 2019/0172285 A1* | 6/2019 | Jin | H04W 4/80 |
| 2019/0182672 A1* | 6/2019 | Kuenzi | H04W 12/084 |
| 2019/0236877 A1 | 8/2019 | Scoggins et al. | |
| 2019/0327098 A1* | 10/2019 | Hart | E05B 45/06 |
| 2019/0371101 A1* | 12/2019 | Friedli | G07C 9/38 |
| 2020/0100108 A1 | 3/2020 | Everson et al. | |
| 2020/0143611 A1 | 5/2020 | Shin et al. | |
| 2020/0160633 A1 | 5/2020 | Zhang et al. | |
| 2020/0314651 A1 | 10/2020 | Pirch et al. | |
| 2020/0351661 A1 | 11/2020 | Kuenzi et al. | |
| 2020/0396680 A1* | 12/2020 | Murali | H04W 52/0206 |
| 2021/0019970 A1* | 1/2021 | Strömberg | G06F 21/88 |
| 2021/0056786 A1* | 2/2021 | De La Garza | H04W 4/029 |
| 2021/0136157 A1* | 5/2021 | Kauppila | H04L 67/141 |
| 2021/0302536 A1 | 9/2021 | Casamassima et al. | |
| 2022/0060450 A1* | 2/2022 | Slovetskiy | H04L 67/142 |

FOREIGN PATENT DOCUMENTS

| | | | |
|---|---|---|---|
| CN | 104620250 | A | 5/2015 |
| CN | 204390327 | | 6/2015 |
| CN | 104778765 | A | 7/2015 |
| CN | 106652145 | | 5/2017 |
| CN | 106846583 | | 6/2017 |
| CN | 107735817 | A | 2/2018 |
| CN | 108683674 | A | 10/2018 |
| CN | 109559407 | A | 4/2019 |
| EP | 2677506 | A2 | 12/2013 |
| EP | 2677506 | A3 | 4/2015 |
| EP | 2425516 | | 9/2019 |
| EP | 3635978 | | 4/2020 |
| EP | 3748900 | | 12/2020 |
| JP | 2005157881 | A | 6/2005 |
| JP | 2017138926 | | 8/2017 |
| JP | 2019061672 | A | 4/2019 |
| JP | 2020511069 | A | 4/2020 |
| JP | 2020202505 | A | 12/2020 |
| KR | 20130142646 | | 12/2013 |
| KR | 101598793 | | 3/2016 |
| WO | 2016019064 | | 2/2016 |
| WO | 2016027405 | | 2/2016 |
| WO | WO-2020061567 | A1 | 3/2020 |
| WO | 2020074430 | | 4/2020 |
| WO | 2020197283 | | 10/2020 |
| WO | 2022144099 | | 7/2022 |
| WO | 2022144100 | | 7/2022 |

OTHER PUBLICATIONS

"ILOQ NFC", [Online] Retrieved from the Internet: URL: https: www.iloq.com nfc the-big-idea , (Retrieved on Feb. 4, 2021), 6 pgs.

"SALTO JustIN Mobile", SALTO Systems, [Online] Retrieved from the Internet: URL: https: www.saltosystems.com en product-range explanation 1 salto-justin-mobile , (Retrieved on Feb. 4, 2021), 3 pgs.

"Yale SCLAK", ASSA ABLOY, [Online] Retrieved from the Internet: URL: https: www.yalelock.it en yale yale-italy smart-living yale-sclak , (Retrieved on Feb. 4, 2021), 3 pgs.

"ASSA CLIQ Electronic Access Control", ASSA ABLOY, [Online] Retrieved from the Internet on Feb. 4, 2021: URL: https: www.assalock.com en products eac c4cliq1 , (2019), 3 pgs.

"Parakey—The market's leading platform for mobile access", Parakey AB, [Online] Retrieved from the Internet: URL: https: www.parakey.co , (Retrieved on Feb. 4, 2021), 10 pgs.

"Universal Module V3", Danalock ApS, [Online] Retrieved from the Internet on Feb. 3, 2021: URL: https: danalock.com products universal-module-v3 , (2021), 9 pgs.

"SpiderDoor ByFlow Technology", SpiderDoor, https: www.spiderdoor.com spiderdoor1606342074526, (Retrieved on Feb. 4, 2021), 1 pg.

"Honeywell InTym: Time And Attendance", Honeywell HBT, [Online] Retrieved from the Internet on Feb. 5, 2021: URL: https: www.honeywellbuildings.in intelligent-security mass-mid-segment access-control-system software intym-time-and-attendance, (2020), 11 pgs.

"Manage Time and Attendance the Smart Way—Presenting InTym Powered by Honewell", Honeywell International Inc., (2019), 2 pgs.

"Parakey Video", Facebook, [Online] Retrieved from the Internet on Feb. 5, 2021: URL: https: www.facebook.comparakey.co videos vb.243234885877809 685004845587610 ?type=2andtheater, (Mar. 25, 2020), 5 pgs.

"International Application Serial No. PCT EP2021 075225, International Search Report mailed Jan. 14, 2022", 5 pgs.

(56) References Cited

OTHER PUBLICATIONS

"International Application Serial No. PCT EP2021 075225, Written Opinion mailed Jan. 14, 2022", 8 pgs.
"International Application Serial No. PCT EP2021 075234, International Search Report mailed Jan. 10, 2022", 4 pgs.
"International Application Serial No. PCT EP2021 075234, Written Opinion mailed Jan. 10, 2022", 5 pgs.
Alexandrou, Alex, "Physical Security: Interior Applications—Doors, Access Control", Shapiro L., Maras MH. (eds) Encyclopedia of Security and Emergency Management, Springer, Retrieved from the Internet: URL: https: doi.org 10.1007 978-3-319-69891-5_41-2, (2019), 8 pgs.
Arnosti, Christof, "Secure Physical Access with NFC-enabled Smartphones", IMVS Fokus Report, (2015), 9 pgs.
Karim, Rafid, "Smart Door Lock: A first prototype of a networked power lock controller with an NFC interface", Thesis, KTH Royal Institute of Technology, Stockholm, SE, (Dec. 1, 2013), 63 pgs.
"U.S. Appl. No. 18/259,129, Non Final Office Action mailed Mar. 12, 2025", 17 pgs.
"U.S. Appl. No. 18/259,129, Response filed Aug. 26, 2025 to Final Office Action mailed Jun. 27, 2025", 13 pgs.
"Chinese Application Serial No. 202180092214.4, Office Action mailed Jul. 22, 2025", with English translation, 18 pages.
"Chinese Application Serial No. 202180092475.6, Office Action mailed Jul. 26, 2025", with English translation, 22 pages.
"Japanese Application Serial No. 2023-540107, Notification of Reasons for Refusal mailed Aug. 19, 2025", with English translation, 8 pages.
"U.S. Appl. No. 18/259,129, Final Office Action mailed Jun. 27, 2025", 19 pgs.
"U.S. Appl. No. 18/259,129, Response filed Jun. 4, 2025 to Non Final Office Action mailed Mar. 12, 2025", 13 pgs.
"U.S. Appl. No. 18 259,129, Response filed Jan. 21, 2026 to Non Final Office Action mailed Oct. 21, 2025", 12 pgs.
"Chinese Application Serial No. 202180092214.4, Response filed Nov. 21, 2025 to Office Action mailed Jul. 22, 2025", with English claims, 25 pages.
"U.S. Appl. No. 18/259,129, Advisory Action mailed Sep. 16, 2025", 3 pgs.
"U.S. Appl. No. 18/259,129, Non Final Office Action mailed Oct. 21, 2025", 16 pgs.
"U.S. Appl. No. 18/259,129, Response filed Sep. 19, 2025 to Advisory Action mailed Sep. 15, 2025", 13 pgs.
"Canadian Application Serial No. 3203521, Voluntary Amendment filed Sep. 15, 2025", 8 pgs.
"Chinese Application Serial No. 202180092475.6, Response filed Nov. 21, 2025 to Office Action mailed Jul. 26, 2025", W/English Claims, 16 pgs.
"Japanese Application Serial No. 2023-540086, Notification of Reasons for Refusal mailed Sep. 30, 2025", w/ English Translation, 6 pgs.
"Japanese Application Serial No. 2023-540086, Response filed Dec. 8, 2025 to Notification of Reasons for Refusal mailed Sep. 30, 2025", w/ English Claims, 11 pgs.
"Japanese Application Serial No. 2023-540107, Response filed Nov. 19, 2025 to Notification of Reasons for Refusal mailed Aug. 19, 2025", W/ English Claims, 11 pgs.
"Chinese Application Serial No. 202180092214.4, Office Action mailed Feb. 26, 2026", with English translation, 13 pages.
"Chinese Application Serial No. 202180092475.6, Office Action mailed Apr. 4, 2026", 12 pgs.
"European Application Serial No. 21777703.6, Communication Pursuant to Article 94(3) EPC mailed Mar. 27, 2026", 8 pgs.
"Japanese Application Serial No. 2023-540086, Notification of Reasons for Refusal mailed Mar. 3, 2026", with English translation, 14 pages.
"Japanese Application Serial No. 2023-540107, Notification of Reasons for Refusal mailed Feb. 24, 2026", with manual English translation, 4 pages.
"Korean Application Serial No. 10-2023-7025600, Notice of Preliminary Rejection mailed Mar. 31, 2026", with English translation, 10 pages.
"Korean Application Serial No. 10-2023-7025983, Notice of Preliminary Rejection mailed Mar. 20, 2026", w/ English Translation, 8 pgs.
"U.S. Appl. No. 18/259,129, Advisory Action mailed Apr. 16, 2026", 3 pgs.
"U.S. Appl. No. 18/259,129, Final Office Action mailed Feb. 9, 2026", 19 pgs.
"U.S. Appl. No. 18/259,129, Response filed Apr. 8, 2026 to Final Office Action mailed Feb. 9, 2026", 12 pgs.
"Chinese Application Serial No. 202180092214.4, Response filed Apr. 24, 2026 to Office Action mailed Feb. 26, 2026", with English Claims, 13 pages.

* cited by examiner

FIG. 3
14:40
Wednesday, 3 June
MOBILE ACCESS
Now
Mobile Access
Open Door
Please tap the notification to open the door
Swipe up to Open

PHYSICAL ACCESS CONTROL SYSTEM WITH SECURE RELAY

PRIORITY APPLICATION(S)

This application is a national stage application under 35 U.S.C. § 371 of PCT Appl. No. PCT/EP2021/075234, titled "Physical Access Control System with Secure Relay," filed Sep. 14, 2021, which claims priority to U.S. Prov. Patent Appl. No. 63/132,947, filed Dec. 31, 2020, each of which is incorporated herein in its entirety by reference.

TECHNICAL FIELD

Embodiments illustrated and described herein generally relate to automatic identity authentication systems that authenticate users for access to secure resources, and to system architectures for identity authentication systems.

BACKGROUND

Physical access control systems (PACs) grant physical access to an authorized user through a controlled portal. Typically, the access authorization involves intrusive actions of the user such as entering or swiping an access card at a card reader or entering a personal identification number (PIN) or password. A PAC system authenticates and authorizes a person to pass through a physical access point such as a secured door. Improvements to PAC systems are described herein having innovative interplay between wireless technologies, smart phones, secure access points, and cloud infrastructure.

DETAILED DESCRIPTION

Figure 1:
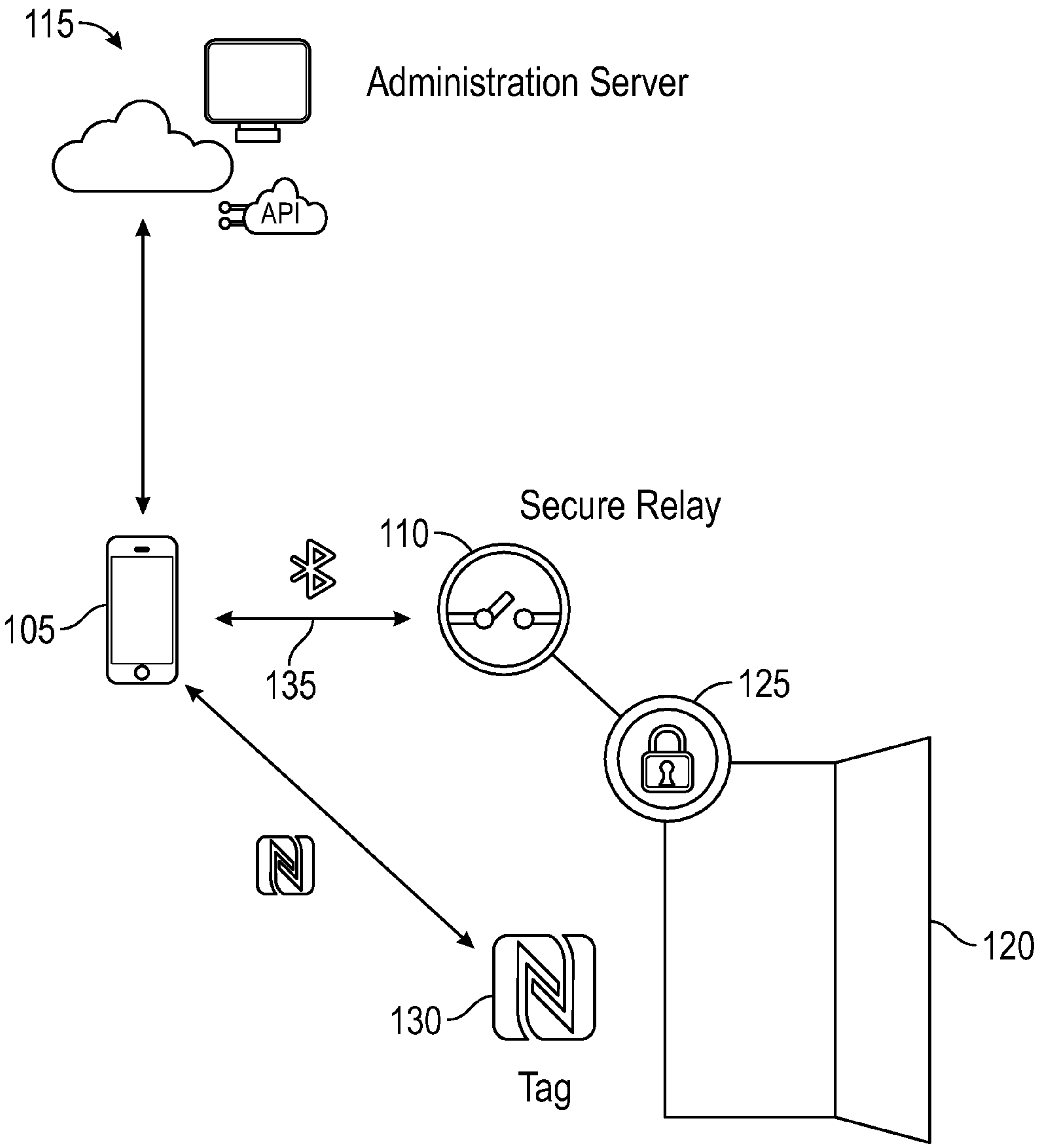
FIG. 1 is an illustration of an example of portions of a secure access control system.

It is desirable for automatic authentication of a person's identity based on verifiable identity information to be fast and secure. FIG. 1 is an illustration of an access control system. The system includes a mobile device 105, a secure relay device 110 and an administration server 115. Some examples of the mobile device 105 are a mobile phone (e.g., a smartphone), a wearable computing device (e.g., a smartwatch), a tablet computer, or any other portable computing device. The mobile device 105 stores access credential information that controls the access of the user to the physical access portal. The secure relay device 110 grants the access based on the access credential information provided by the mobile device 105. While the secure relay device 110 controls the actual physical access to the physical portal 120 (e.g., a door), it is a relatively simple device that does not require access to a system backend server or a system access control server. The secure relay device 110 only needs to receive information from the mobile device 105 using out of band (00B) signaling different from the cellular network (e.g., Bluetooth® Low Energy (BLE) signaling) and to initiate opening of the physical portal 120. The secure relay device 110 may send a signal or other indication to an automatic lock 125 that secures the physical access portal 120, or the automatic lock 125 may be integral to the secure relay device 110. The automatic lock 125 may be electronic, mechanical, or magnetic locking device or combination thereof.

As will be described herein in more detail, to gain access to the physical portal 120, the mobile device 105 may identify a physical access portal 120 using a beacon signal transmitted by the secure relay device 110. The mobile device 105 initiates secure communication with the secure relay device 110 and pushes an access token for the portal to the secure relay device 110. The secure relay device 110 checks the information in the access token to determine whether to grant access. Alternatively, a Near Field Communication (NFC) tag 130 is deployed at the portal and may be used by the mobile device ("tapped") to identify the secure relay device 110 and initiate a secure communication with the secure relay device 110. An example of the interaction of the mobile device 105 and the secure relay device 110 is described below.

Figure 2:
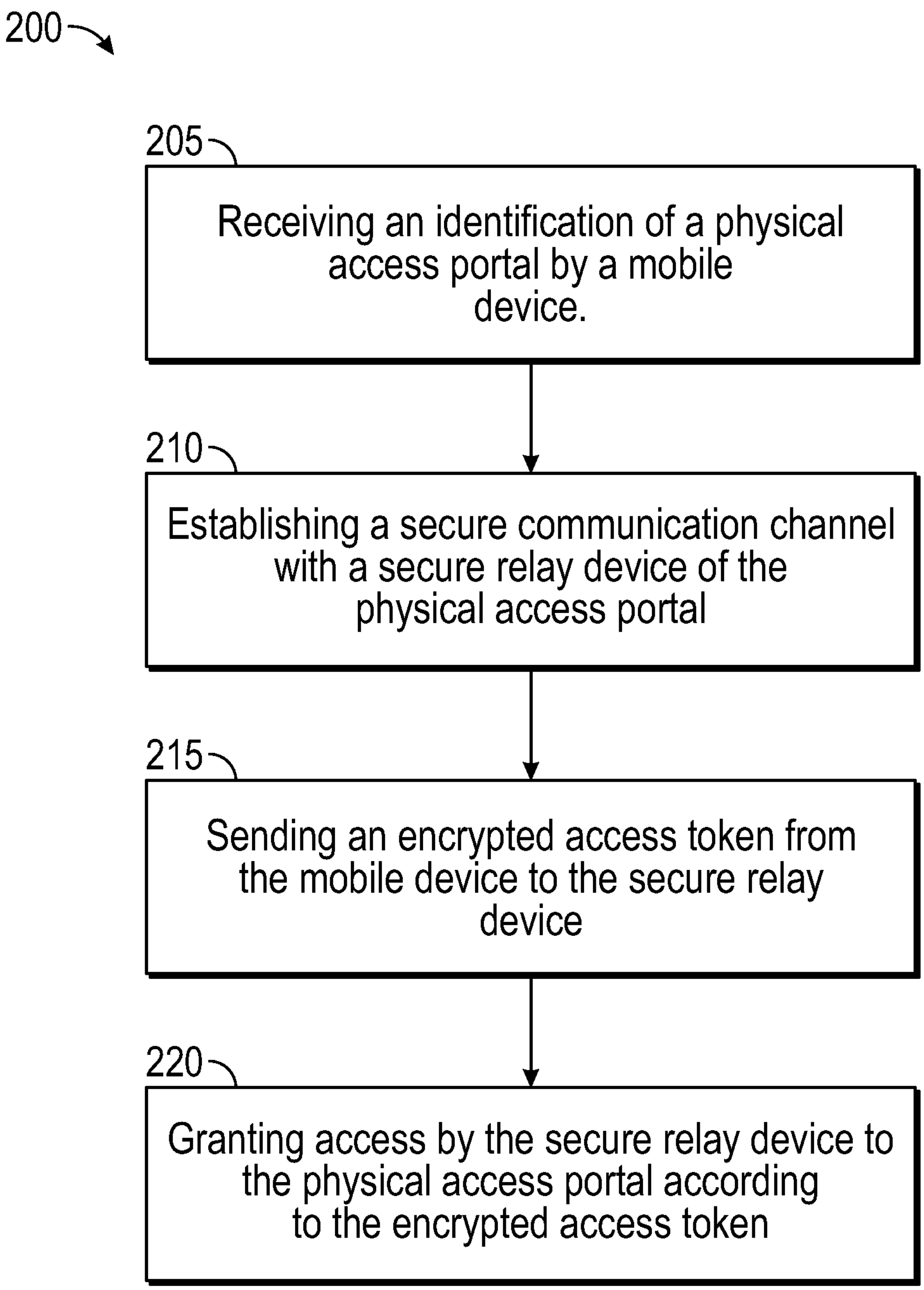
FIG. 2 is a flow diagram of an example of a method of operating an access control system.

FIG. 2 is a flow diagram of an example of a method 200 of operating an access control system, such as the access control system shown in FIG. 1. At block 205, identification of a physical access portal 120 is received by a mobile device 105. The mobile device 105 may receive the identification from a beacon signal transmitted by a secure relay device 110. The secure relay device 110 is located near the physical access portal 120 and may broadcast a beacon signal. The beacon signal may be a low energy BLE beacon signal. In some examples, the beacon signal is a ultra-wide band (UWB) beacon signal.

UWB is a radio communication methodology that uses a wide signal bandwidth. The wide bandwidth is typically defined as either a −10 decibel (−10 dB) bandwidth greater than 20% of the center frequency of the signal, or a bandwidth greater than 500 megahertz (500 MHz) in absolute terms. Commercial UWB systems are intended to be used in complex environments such as residential, office, or industrial indoor areas. In these environments, signal reflection and diffraction play a significant role. The signal received by an antenna is the sum of the attenuated, delayed and possibly overlapping versions of the transmitted signal and may vary over time (due to movement of receiver/transmitter or change in environment). These different versions of the transmitted signal are typically referred to as multipath components. The large bandwidth of UWB systems provides a high level of resilience to frequency selective fading, which is an effect that can limit the performance of narrow-band technologies. Presence of UWB signaling from a UWB capable secure relay device 110 detected by a UWB capable mobile device 105 can be used to detect presence of the user near a physical access portal 120.

The accurate ranging capability of UWB signaling allows intent of the user (e.g., movement toward a physical access portal) to be determined. This localization-based intent of the user can be deduced by the change in distance between a UWB capable mobile device 105 and a UWB capable secure relay device 110, and by the change in angle between the mobile device 105 and the secure relay device 110. In some examples, the mobile device 105 may perform ranging using Time-of-Flight (TOF) Two Way Ranging (TWR). In TWR, radio packets are exchanged between the mobile device 105 and the secure relay device 110. The timing differences for the transmitting and receiving of the packets between the mobile device 105 and the secure relay device 110 can be used to calculate ranging information such as change in one or both of distance and angle to determine intent of the user to gain access to the physical access portal 120. The detected physical access portals 120 can then be sorted and displayed according to one or more of distance of the mobile device from the physical access portal, position of the mobile device relative to the physical access portal, and movement of the mobile device relative to the physical access portal. Examples of approaches of localization-based intent can be found in co-pending U.S. patent application Ser. No. 16/828,001, and in co-pending Paris Cooperation Treat (PCT) Applications PCT/EP2020/058197, PCT/EP2020/076428, PCT/EP2020/058199, and PCT/EP2020058216, each of which is incorporated herein by reference in its entirety. One or both of the proximity of the mobile device 105 to the secure relay device 110 and the movement of the mobile device relative to the secure relay device can be used to deduce intent of the user of the mobile device 105 to gain access to the physical access portal 120. The proximity and intent of the user can be determined by the mobile device using UWB signaling or BLE Relative Signal Strength Indicator (BLE RSSI).

At block 210, a verification application of the mobile device 105 begins the process to verify that the user has authorization for the access. To verify the authorization, the verification application sends to the secure relay device 110 the access credential information of the user, which is stored in the mobile device 105. In some examples, the access credential information is an access token that shows authorization for access to the physical portal.

Access tokens are presented by the mobile device 105 to the secure relay device 110 to grant access to the portal when authorization of the user is verified by the mobile device 105. The access token proves that the mobile device 105 has access rights. An access token can include one or more of an Access Token ID, a Mobile Device ID, a Relay ID, any additional access control information, a start time for the access, an expiration time for the access, and a cryptographic signature. The Access Token ID is a unique identifier of the token. The Mobile Device ID and Relay ID establish that this mobile device 105 can open the portal secured by the secure relay device. The additional access control information can include additional access control rules (e.g., time of day that access is allowed). The start time and expiration time determine the validity period for which the Access Token is valid (e.g., one day, one week, etc.). The cryptographic signature is checked by the secure relay device 110, and the signature is taken over all the fields of the access token and is generated using the private key for the access tokens.

The access tokens are generated by an administration server 115 and are periodically pushed to mobile devices 105 having the corresponding Mobile Device ID. The administration server also maintains an access revocation list for every secure relay device. Each list contains the Access Token IDs that are currently invalid for the secure relay. When a new revocation list is available, the administration server pushes the new revocation list to all the mobiles devices that currently have access to the secure relay device 110. A mobile device 105 pushes the revocation lists it receives from the administration server to the secure relay device 110 during the door opening sequence where they are stored.

To verify access of the mobile device holder to a particular secure relay device 110, the secure relay device 110 compares the access token to the revocation list of Access Token IDs. At block 215, a mutually authenticated secure channel is established between the mobile device 105 and the secure relay device 110 before sending access credential information to the secure relay device 1109. Device authentication information is sent from the mobile device 105 to the secure relay device 110. The authentication information can include a certificate and a mobile device identifier (ID). The mobile device 105 may also authenticate the secure relay device 110. The secure relay device 110 may send authentication information (e.g., a certificate and a Relay ID) to the mobile device 105 which the mobile device 105 uses to authenticate the secure relay device 110. After the secure channel is established, the mobile device 105 sends encrypted access credential information via the secure channel. Cryptography in the access control system may be based on public key infrastructure (PKI).

At block 220, the mobile device 105 sends the access credential information to the secure relay device 110 when the device authentication is completed. The access credential information is encrypted and integrity protected. At block 225, the secure relay device 110 verifies the access credential information and grants access to the physical access portal 120 based on the access credential information. The mobile device 105 may display the opening status of the physical access portal 120. If the access credential information is an access token, the secure relay device 110 may check the signature, start and expiration times, and the additional access information to determine if the physical portal should be opened.

Returning to FIG. 1, the mobile device 105 may be online to perform the verification and authentication functions described but does not have to be online and may perform the functions offline. The mobile device 105 may occasionally connect to a network (e.g., the Internet or a cellular phone network) to receive updated access credential information pushed from the administration server 115. Additionally, the verification application may periodically initiate the transmitting of a request for status (e.g., an Online Certificate Status Protocol (OCSP) request) to the administration server 115 or other verification device for the access credential information of the user and receives and stores a response (e.g., an OCSP response) to the request. The OCSP response proves that the mobile device 105 is included in the access control system. As part of the authentication process, the mobile device 105 may push the response to the secure relay device 110 as part of the access credential information. The secure relay device 110 checks the response and closes the connection if the response is not valid.

When a mobile device 105 is introduced to the access control system, it is personalized by the verification application and the administration server 115. The mobile device 105 establishes a secure connection with the administration server 115 and authenticates the user, such as by providing a password, invitation code, and the like. The verification application generates a key pair that is sent to the administration server 115. The administration server 115 issues a certificate for the public key of the key pair and issues a Mobile Device ID with the certificate as the root. This personalization information is then sent to the mobile device 105. The personalization information includes certificates from the certificate authority (CA certificates) for the mobile device 105 and secure relay device 110. The mobile device may also receive the latest access tokens and revocation lists and stores them in its long term memory. The status request (e.g., OCSP request) may be sent as part of the personalization.

The personalization information may be stored in a secure element (SE) or secure enclave of the mobile device 105. The SE may include a secure processor or coprocessor that includes a key manager. Communication between the SE and the application processor is tightly controlled, such as by isolating the communication to an interrupt driven mailbox for example. In certain examples the information is included in a trusted execution environment (TEE) of the mobile device. The personalization information may be periodically updated by being pushed to the mobile device by the administration server 115. The information stored in the SE may also include the current response to the request sent to the administration server 115 and a CA certificate.

As explained previously herein, the mobile device may identify the physical access portal 120 from a beacon signal broadcast by the secure relay device 110. In some examples, mobile device 105 identifies the physical access portal using an NFC tag 130. The NFC tag 130 is located near the physical access portal. The NFC tag 130 may include a smart card (e.g., a JavaCard enabled smart card). The user may bring the mobile device 105 close to the NFC tag 130 (e.g., to "tap" the NFC tag with the mobile device), and the mobile device 105 authenticates the NFC tag 130. The information read from the NFC tag can be encrypted or otherwise cryptographically protected.

The communication between the NFC tag 130 and the mobile device 105 is secure. The mobile device 105 authenticates the NFC tag 130 and, in some examples, asymmetric cryptography is used for authentication. In some examples, symmetric cryptography is used, but symmetric cryptography may use more power and require more complicated key management by the verification application of the mobile device 105. The NFC tag 130 can include a tag private key and a tag ID. The NFC tag 130 is personalized by the administration server 115. The administration server chooses a Tag ID and generates a key pair on the card and the public key of the key pair is read out. The administrator issues a certificate for the public key and the Tag ID is issued with the tag certificate authority (Tag CA) as root. Afterward the NFC tag 130 can be locked from further changes. The mobile device 105 may store tag certificates to authenticate NFC tags. The certificates may be received as part of the personalization of the mobile device 105.

After authenticating the NFC tag 130, the mobile device 105 connects wirelessly to the secure relay device 110, such as via BLE signaling 135 for example. The mobile device 105 and the secure relay device 110 then authenticate each other as described previously herein. In this manner, the verification application of the mobile device 105 does not need to run all the time. The verification application may automatically open in response to reading the NFC tag 130. In some examples, the user may need to unlock the mobile device before "tapping" the NFC tag 130 to automatically launch the verification application. In some examples, such as for mobile devices employing iOS, the user may need to unlock the mobile device 105 and launch the verification application before "tapping" the tag and initiating communication with the secure relay device. In some examples, such as for mobile devices employing iOS, the mobile device 105 may present a notification (e.g., an icon) of the verification application on a display screen of the mobile device 105.

Using NFC tags in a physical access control system may be more convenient than using the mobile device 105 to scan for beacons from physical access portals. Users may find the tapping of the NFC tag 130 with the mobile device 105 more intuitive or convenient, especially if the verification application automatically launches in the mobile device 105 in response to the tapping (e.g., an Android mobile device). Without using NFC tags there may be less chance that the user is actually standing in front of the portal that the user desires to open. With a scanning approach, an unauthorized user may try to open doors that are physically far away from the mobile device. The NFC tag 130 provides proof of location of the user at the physical access portal.

Figure 3:
FIG. 3 is an example of a display screen of a mobile device.

FIG. 3 is an example of a notification presented by the mobile device 105. The user activates the verification application by pressing or otherwise contacting the notification on the display screen. When the application is activated, the user can "tap" the NFC tag 130 with the mobile device 105. The verification application reads the encrypted information from the NFC tag 130 after the verification application is started.

Figure 4:
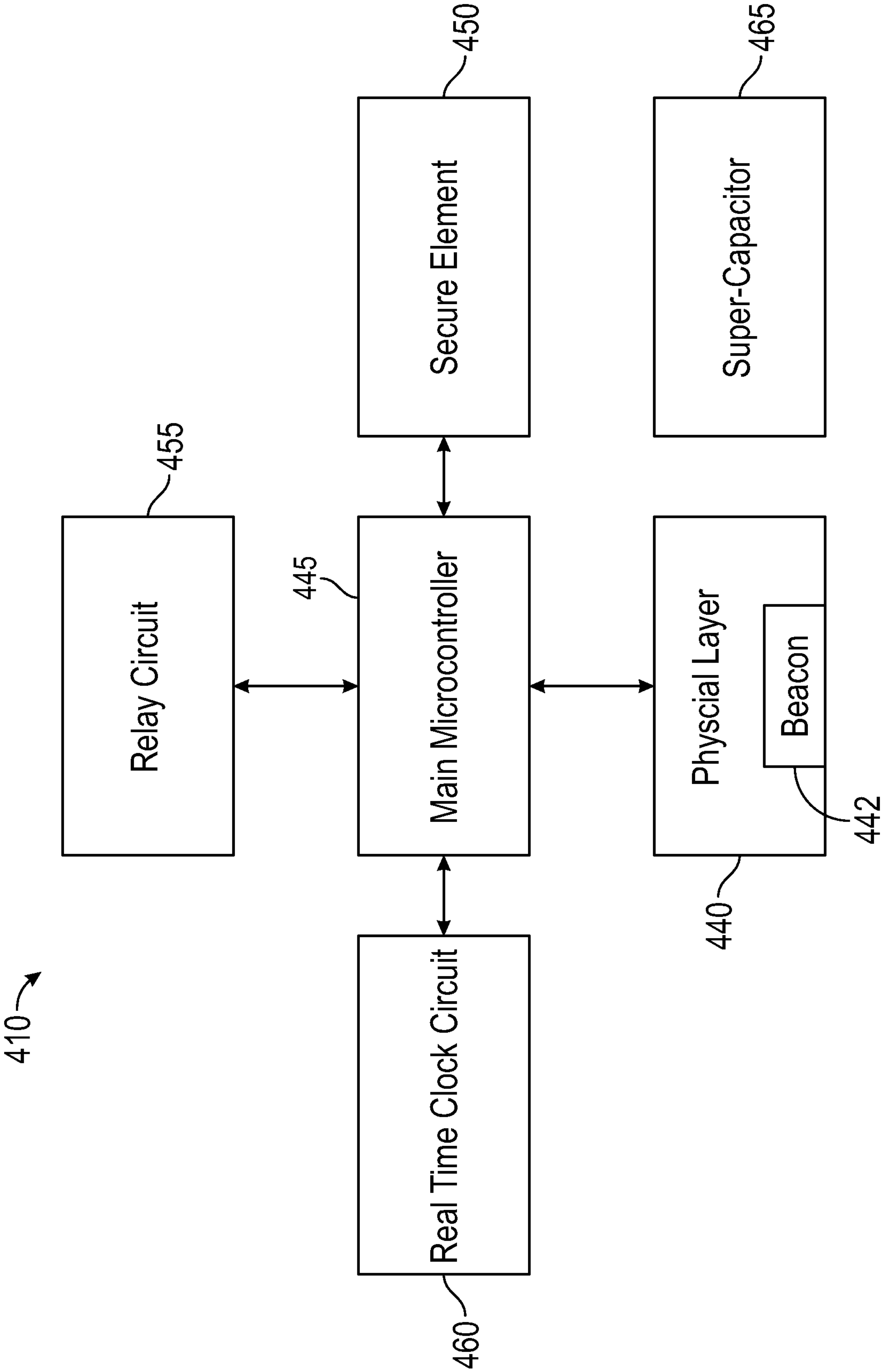
FIG. 4 is a block diagram illustrating an example of portions of a secure relay device.

FIG. 4 is a block diagram of an example of a secure relay device 410 of an access control system (e.g., the secure relay device 110 of FIG. 1). The secure relay device 410 includes physical layer circuitry 440 and processing circuitry. The processing circuitry can include a microprocessor or microcontroller 445. The secure relay device 410 can include memory separate from or integral to the microcontroller 445 that contains executable instructions to perform any of the functions or operations of a secure relay device described herein, such as the functionality described regarding the method of FIG. 2 for example. The processing circuitry is responsible for OOB signaling (e.g., BLE communication), personalization of the smart relay device, processing command received from the mobile device, storing the revocation list and personalization parameters, and implementing functions of transport layer security (TLS).

The physical layer circuitry 440 transmits and receives information wirelessly. The physical layer circuitry 440 may broadcast a beacon signal readable by a mobile device to identify the secure relay device 410, or the physical layer circuitry 440 may include separate circuitry (beacon module 442) for providing beacon functionality. The beacon signal may be a BLE signal and the secure relay device acts as a BLE central device for communication with the mobile device as the peripheral device. The beacon module 442 may act as an iBeacon device. The beacon module 442 may include a separate processor used for the beacon functionality. The beacon module 442 may be connected to the main microcontroller 445 using the inter-integrated circuit (I2C) protocol. Upon startup, the main microcontroller 445 sends the Relay ID that the beacon should advertise to the beacon module 442. The beacon module 442 may store the Relay ID in major and minor version fields of the advertising data and begins advertising the Relay ID using the out of band signaling.

As explained previously herein, the secure relay device 410 authenticates the mobile device and provides authentication information to the mobile device. The processing circuitry may implement transport layer security or TLS (e.g., TLS 1.2). As explained herein, key material may be stored in a secure element of the secure relay device. If the out of band signaling is BLE, initially all the incoming BLE data is forwarded using the TLS handshaking procedure and the responses are sent back using BLE. During the TLS handshake, the Mobile ID is extracted (e.g., from the serial number of the peer certificate) and is used throughout the session. Once the handshake is complete, all BLE traffic is first TLS unwrapped. Once a full TLS frame is received, the command stored in the frame is processed by the processing circuitry, the response to the command is wrapped and sent to the mobile device. For a BLE disconnect or a general failure, the TLS handshake is reset and the handshake should be completed again. The processing circuitry of the secure relay device 410 decodes authentication information received from the mobile device and encodes its authentication information for sending to the mobile device. When the devices authenticate, the secure relay device 410 receives encrypted access information from the mobile device and the processing circuitry decrypts the access information to grant or deny access to the user. A relay circuit 455 is enabled when the access is granted, and the relay circuit may cause an automatic lock (e.g., automatic lock 125 in FIG. 1) to unlock the physical access portal (e.g., physical access portal 120 of FIG. 1).

The secure relay device 410 may open the physical access portal in response to an "Open" command received from the mobile device with a valid access token. In response to the Open command, the secure relay device 410 may perform the sequence that follows. The secure relay device 410 checks that a successful "Push OCSP data" command was performed within the current TLS session, parses the access token supplied in the Open command, checks the signature of the access token and validity of the access token, verifies that the access token is not included in the revocation list, and opens the door if the access token is valid and not on the revocation list. The "Push OCSP data" is a response to a valid OCSP response received from the mobile device and includes the sequence that follows. The secure relay device 410 parses the OCSP response, checks the OCSP response signature and validity of the OCSP response, and returns revocation list information to the mobile device if the OCSP response is valid.

The secure relay device 410 may receive a revocation list when the verification application of the mobile device performs a "Push revocation list" command. The secure relay device 410 checks whether a "Push OCSP data" command was performed within the current TLS session. If the command was performed, the secure relay device 410 parses the revocation list and checks the revocation list signature and validity. If the revocation list currently stored by the secure relay device 410 is an earlier version, the secure relay device 410 stores the later pushed version of the revocation list.

The secure relay device 410 can include a secure element 450 to store one or more cryptographic keys for operation of the secure relay device 410. The secure element 450 may store one or more of a Relay private key, Relay certificate, Relay ID, a mobile device CA certificate, and a mobile device certificate response public key. The access information may include an access token, and the secure element 450 may store an access token private key for access token decryption. The secure relay device 410 may also store an access token revocation list. As explained previously herein, the secure element 450 may include a secure processor or coprocessor that includes a key manager. In some examples, the secure element 450 performs the cryptographic operations. The secure element 450 may communicate with the main microcontroller 445 using I2C.

Data, such as any policies or revocation lists or other updated data, that the secure relay device 410 needs is pushed to the secure relay device 410. Specifically, the administration server 115 would push such information to several or all mobile devices 105, and when such mobile device 105 interacts with a given secure relay device 410, the updated data is pushed to the secure relay device 410.

Thus, the policies and revocation lists are updated in the secure relay devices 510 even though the secure relay devices 410 may be offline.

As explained previously herein, an access token may include a start time for the access and an expiration time for the access by the user, and the secure relay device 410 may grant access according to time policy. To keep time, the secure relay device 410 can include a real time clock (RTC) circuit 460. It can be important for the RTC to be accurate so the secure relay device can perform accurately. The access control system may include many secure relay devices 410 and the RTC of the secure relay devices 410 may eventually deviate from each other and/or from the real time. To synchronize the RTCs with each other and/or to the real time, the secure relay devices 410 can recurrently communicate to an external time server, which may be the same or different from the administration server. However, the communication with the time server should be secure. When the time comes to synchronize the RTC, the processing circuitry of the secure relay device 410 establishes a secure communication channel with the secure time server and reads a real time clock value to synchronize the RTC of the secure relay device 410 to the RTC of the external secure time server. In some examples, the communication between the secure relay device 410 and the time server is via a mobile device acting as a network gateway.

The secure relay device 410 should not lose the time in the event of a power cutoff. A battery backup can be used to provide backup power to the RTC circuit 460, but a battery should be periodically checked and replaced. To provide power backup to the RTC, the secure relay device 410 can include a super-capacitor 465. A super-capacitor 465, sometimes called an ultra-capacitor, refers to a capacitor having a different dielectric material than a conventional capacitor (e.g., a non-solid dielectric material) and has an energy density much greater than the energy density of electrolytic capacitors (e.g., 10,000 times)). A super-capacitor 465 can provide power for the RTC circuit for multiple days.

Figure 5:
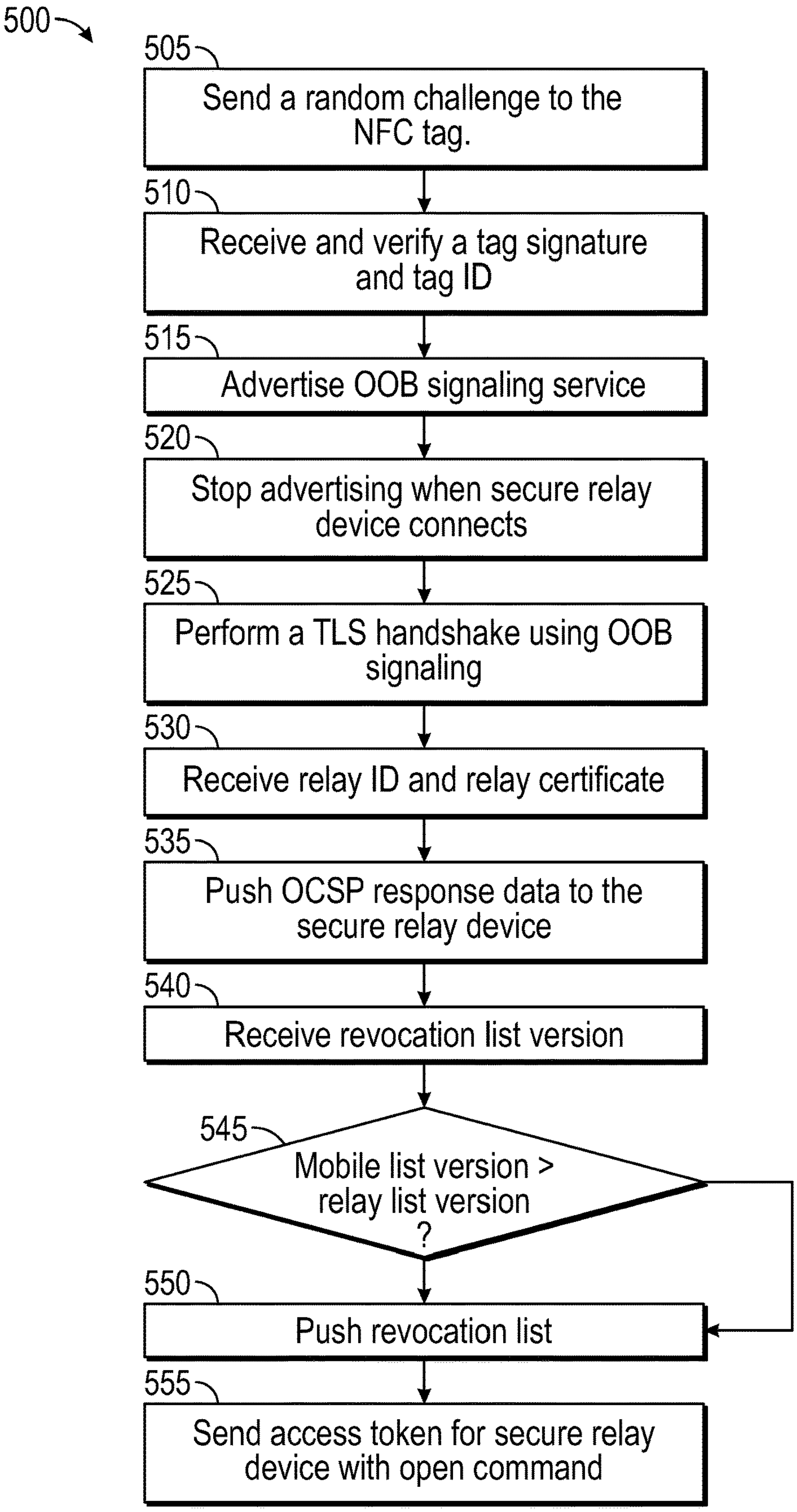
FIG. 5 is a flow diagram of a verification and opening sequence for an access control system.

FIG. 5 is a flow diagram of a verification and opening sequence 500 for an access control system that uses NFC tags 130 and access tokens. At block 505, the mobile device 105 generates a random challenge and sends the random challenge to the NFC tag 130. At block 510, the mobile device 105 receives Tag signature and Tag ID. The mobile device 105 may retrieve the Tag certificate corresponding to the Tag ID in its long-term storage.

At block 515, the mobile device 105 starts advertising its OOB service (e.g., BLE service) and waits for the secure relay device 110 to connect. In normal operation, the mobile device 105 does not advertise, and the advertising may only be performed as part of the verification and opening sequence. At block 520, the mobile device 105 stops the advertising when the secure relay device 110 connects. At block 525, the mobile device 105 performs a TLS handshake with the secure relay device using OOB signaling. At 530, the mobile device 105 receives the Relay ID from the secure relay device 110.

At block 535, the mobile device 105 retrieves its current OCSP response from long term storage and pushes the OCSP response data to the secure relay device 110. At block 540, the secure relay device 110 returns the version of the access token revocation list it currently stores or an indication that no revocation list is stored. At block 545, the mobile device 105 determines if the version of its revocation list is greater (i.e., later) than the revocation list of the secure relay device 110 or if there is no revocation list is currently stored in the secure relay device 110.

At block 550, pushes its version of the access token revocation list if the secure relay device 110 has an earlier version, or if the secure relay device 110 does not have a revocation list stored. At block 555, the mobile device 105 sends the access token with an Open command to the secure relay device. The secure relay device 110 grants or denies access based on the information in the access token and the revocation list. The mobile device 105 may present status of the opening of the physical access portal 120 to the user.

The administration server 115 can be implemented as a set of command-line scripts (e.g., python scripts) and may include a graphical user interface (GUI). The set of command-line scripts can include server initialization scripts, access token generation scripts, revocation list generation scripts, secure relay device personalization scripts, NFC tag 130 personalization scripts, and mobile device provisioning scripts.

Server initialization generates keys, certificates, and the file system structure, and the initialization can include the sequence that follows. A CA key pair and certificate are generated for a mobile device, a CA key pair and certificate are generated for a secure relay device, a tag CA key pair and certificate are generated, an access token signing key pair may be generated, and a revocation list signing key pair may be generated. These key pairs and certificates are generated for each physical access portal 120. Additionally, OCSP responses are signed by the mobile device CA key pair.

Generating access tokens by the administration server 115 can include providing Mobile Device ID, Relay ID, start time, and end time to the access token generation script. The script composes an access token using the provided information, signs the access token using an access token signing private key, and writes the new access token to a server database. The script maintains the current access token ID in the database and may increment the access token ID for each generated access token.

Generating revocation lists by the server can include providing Relay IDs and Access Token IDs to the revocation list generation script. The script composes a revocation list with this information, signs the revocation list using a revocation list public key, and writes the new revocation list to the server database. The revocation list generation script maintains a revocation list for every secure relay device and may increment the revocation list version every time it generates a new revocation list for the secure relay device.

The secure relay device 110 personalization script takes a Relay ID as input and performs the sequence that follows. The current time and the Relay ID are sent to the secure relay device. Mobile device certificates, an access token public key, an OCSP key, and a revocation public key are sent to the secure relay device. The script triggers key pair generation on the secure relay device. The administration server 115 receives the public key of the key pair, sends a CA certificate to the secure relay device 110, and stores the certificate in the server database. The secure relay devices 110 may be personalized using an NFC interface of the secure relay device 110.

The NFC tag 130 personalization script takes the NFC tag ID as input and performs the sequence that follows. The script sends a tag ID to the NFC tag 130 and triggers key par generation. The administration server 115 receives the public key of the key pair, sends a CA certificate to the NFC tag, and stores the certificate in the server database.

Conventional physical access control systems include a credential device that holds the users access credentials, a reader device to check the credential and a controller device to grant physical access. The credential device stores an access credential that is presented to the reader device that receives and authenticates the access credential. If the reader device grants access, the reader device may send notification (e.g., a signal or message) to an access controller to open the physical access portal. The reader device and the access controller can be incorporated into one device. The reader device and access controller may communicate with a backend system of the access control system (e.g., a backend server). The access credential is authenticated by an authentication engine of the backed system. The present systems, devices, and methods described herein provide a secure access control system in which the roles of the reader device, the access controller device, and the backend server are performed by a mobile device 105 and a secure relay device 110. A secure validated connection is established between the secure relay device 110 and the mobile device 105, and the access credential is securely transferred between the mobile device 105 and the secure relay device 110 using any of the methods described herein. This transfer can occur while the secure relay device 110 and the mobile device 105 are offline from the access control system backend. The mobile device 105 provides updated information (e.g., a revocation list) to the secure relay device 110 again while the devices are offline form the backend system. Thus, each of the mobile device 105 and the secure relay device 110 play part of the role of the backend system of a conventional access control system. This reduces the complexity of verification and granting access to a physical portal and thereby reduces the complexity of the device or devices needed per physical access portal (e.g., per door).

Figure 6:
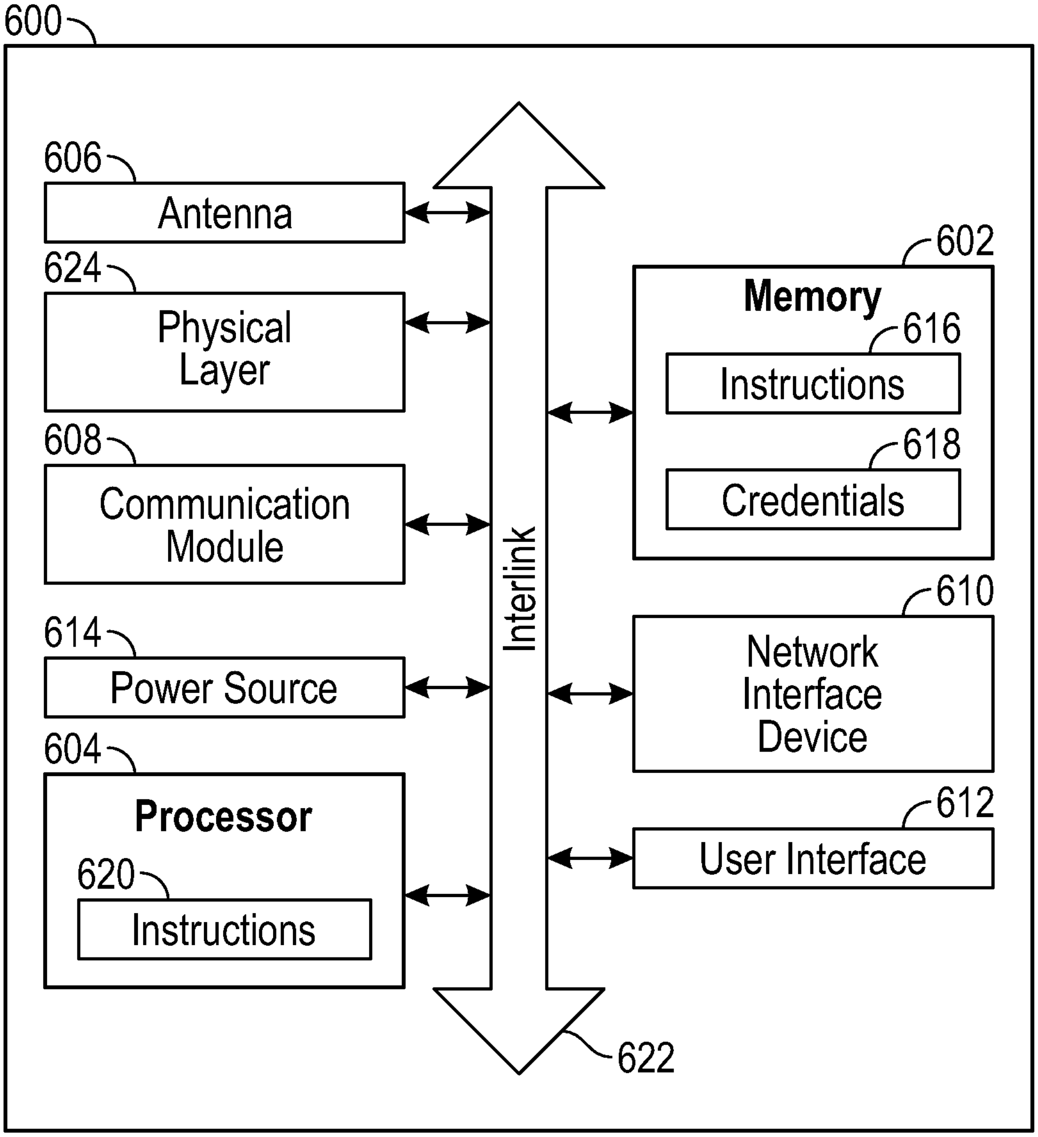
FIG. 6 is a block diagram schematic of portions of an example of a mobile device.

FIG. 6 is a block diagram schematic of various example components of a device 600 for supporting the device architectures described and illustrated herein. The device 600 of FIG. 6 could be, for example, a mobile device (e.g., the mobile device 105 of FIG. 1) that authenticates credential information of authority, status, rights, and/or entitlement to privileges for the holder of the device. The device 600 both holds the user access credentials and executes a verifier application that authenticates the access credentials.

With reference specifically to FIG. 6, additional examples of a device 600 for supporting the device architecture described and illustrated herein may generally include one or more of a memory 602, processing circuitry such as processor 604, one or more antennas 606, a communication port or communication module 608, a network interface device 610, a user interface 612, and a power source 614 or power supply.

Memory 602 can be used in connection with the execution of application programming or instructions by processing circuitry, and for the temporary or long-term storage of program instructions or instruction sets 616 and/or authorization data 618, such as credential data, credential authorization data, or access control data or instructions, as well as any data, data structures, and/or computer-executable instructions needed or desired to support the above-described device architecture. For example, memory 602 can contain executable instructions 616 that are used by a processor 604 of the processing circuitry to run other components of device 600, to calculate encryption keys to communicate credential or authorization data 618, and/or to perform any of the functions or operations described herein, such as the functions as operations of a mobile device described regarding the method of FIG. 2 for example.

Memory 602 can comprise a computer readable medium that can be any medium that can carry, contain, store, communicate, or transport data, program code, or instructions for use by or in connection with device 600, such as instructions for a verification application for example. Memory can include memory contained in a secure element of the mobile device. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

The processing circuitry of the device 600 is configured (e.g., by firmware) to perform the functions of mobile devices described herein. Such as the functions and operations of the mobile device described regarding the method of FIG. 2 for example. The processing circuitry can correspond to one or more computer processing devices or resources. For instance, processor 604 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 604 can be provided as a microprocessor, Central Processing Unit (CPU), or plurality of microprocessors or CPUs that are configured to execute instructions sets stored in an internal memory 620 and/or memory 602. Processing circuitry can include a processor in a secure element of the mobile device.

Antenna 606 can correspond to one or multiple antennas and can be configured to provide for wireless communications between device 600 and another device. Antenna(s) 606 can be operatively coupled to physical layer circuitry comprising one or more physical (PHY) layers 624 to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, ultra-wide band (UWB), and the like. In an example, antenna 606 may include one or more antennas coupled to one or more physical layers 624 to operate using UWB for in band activity/communication and Bluetooth (e.g., BLE) for out-of-band (OOB) activity/communication. However, any RFID or personal area network (PAN) technologies, such as the IEEE 502.15.1, near field communications (NFC), ZigBee, GSM, CDMA, Wi-Fi, etc., may alternatively or additionally be used for the OOB activity/communication described herein.

Device 600 may additionally include a communication module 608 and/or network interface device 610. Communication module 608 can be configured to communicate according to any suitable communications protocol with one or more different systems or devices either remote or local to device 600. Network interface device 610 includes hardware to facilitate communications with other devices over a communication network utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device 610 can include an Ethernet port or other physical jack, a Wi-Fi card, a Network Interface Card (NIC), a cellular interface (e.g., antenna, filters, and associated circuitry), or the like. In some examples, network interface device 610 can include a plurality of antennas to wirelessly communicate using at least one of single-input multiple-output (SIMO), multiple-input multiple-output (MIMO), or multiple-input single-output (MISO) techniques. In some example embodiments, one or more of the antenna 606, communication module 608, and/or network interface device 610 or subcomponents thereof, may be integrated as a single module or device, function or operate as if they were a single module or device, or may comprise of elements that are shared between them.

User interface 612 can include one or more input devices and/or display devices. Examples of suitable user input devices that can be included in user interface 612 include, without limitation, one or more buttons, a keyboard, a mouse, a touch-sensitive surface, a stylus, a camera, a microphone, etc. Examples of suitable user output devices that can be included in user interface 612 include, without limitation, one or more LEDs, an LCD panel, a display screen, a touchscreen, one or more lights, a speaker, etc. It should be appreciated that user interface 612 can also include a combined user input and user output device, such as a touch-sensitive display or the like.

Power source 614 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the device 600. Device 600 can also include one or more interlinks or buses 622 operable to transmit communications between the various hardware components of the device. A system bus 622 can be any of several types of commercially available bus structures or bus architectures.

ADDITIONAL DISCLOSURE AND EXAMPLES

Example 1 includes subject matter (such as a method of operating an access control system) comprising receiving, by a mobile device, an identification of a physical access portal; establishing a secure communication channel with a secure relay device associated with the physical access portal; sending an encrypted access token stored in the mobile device to the secure relay device; and granting access by the secure relay device to the physical access portal according to information stored in the encrypted access token.

In Example 2, the subject matter of Example 1 optionally includes sending an encrypted access token that includes a cryptographic signature taken over an access token identifier and one or more of a mobile device identifier, a secure relay device identifier, an access start time for the physical access portal, and an access expiration time for the physical access portal.

In Example 3, the subject matter of one or both of Examples 1 and 2 optionally includes initiating, by the verification application of the mobile device, a request for status to a verification device for the access credential information of the user; receiving a response to the request; and including the response to the request in the access credential information.

In Example 4, the subject matter of one or any combination of Examples 1-3 optionally includes reading cryptographically protected information from a near field communications (NFC) tag that identifies the physical access portal.

In Example 5, the subject matter of Example 4 optionally includes a verification application of the mobile device beginning executing in response to the reading the cryptographically protected information from the NFC tag.

In Example 6, the subject matter of Example 4 optionally includes presenting a notification of the application on a display screen of the mobile device, starting execution of the application in response to detecting contact with the display screen, and reading the cryptographically protected information from the NFC tag after the application is started.

In Example 7 the subject matter of one or any combination of Examples 1-6 optionally includes receiving the identification of the physical access port in a Bluetooth low energy (BLE) signal.

In Example 8, the subject matter of one or any combination of Examples 1-7 optionally includes establishing a secure communication channel between the secure relay device and a time server, synchronizing a real time clock circuit of the secure relay device with the time server using the secure communication channel, and further granting access by the secure relay device to the physical access portal according to a time policy and a time determined by the real time clock circuit.

Example 9 can include subject matter (such as a secure relay device of an access control system) or can optionally be combined with one or any combination of Examples 1-8 to include such subject matter comprising physical layer circuitry and processing circuitry operatively coupled to the physical layer circuitry. The physical layer circuitry is configured to receive information wirelessly. The processing circuit is configured to decode first authentication information received wirelessly from a mobile device, encode second authentication information for sending to the mobile device, decrypt an access token received from the mobile device in response to the second authentication information, determine validity of the access token, and grant access to a physical access portal according to the decrypted access information.

In Example 10, the subject matter of Example 9 optionally includes a secure element configured to store one or more cryptography keys.

In Example 11, the subject matter of one or both of Example 9 and 10 optionally includes a real time clock circuit coupled to the processing circuitry, and processing circuitry configured to establish a secure communication channel with a time server, synchronize the real time clock circuit with the time server via the secure communication channel, and grant access by the secure relay device to the physical access portal according to the decrypted access credential information, a time policy, and a time determined by the real time clock circuit.

In Example 12, the subject matter of one or any combination of Examples 9-11 optionally includes a super-capacitor coupled to the real time clock circuit to power the real time clock circuit.

In Example 13, the subject matter of one or any combination of Examples 9-12 optionally includes physical layer circuitry configured to transmit a beacon signal readable by the mobile device.

In Example 14, the subject matter of one or any combination of Examples 9-13 optionally includes processing circuitry configured to decrypt an access token that includes an access token identifier, a mobile device identifier, and a secure relay device identifier.

Example 15 includes subject matter (or can optionally be combined with one or any combination of Examples 1-14 to include such subject matter) such as a machine-readable storage medium including instructions that, when executed by processing circuitry of a mobile device, cause the mobile device to perform acts including receiving an identification of a physical access portal, exchanging authentication information with a secure relay device of the physical access portal and establishing a secure channel with the secure relay device, and sending an encrypted access token stored in the mobile device to the secure relay device using the secure communication channel.

In Example 16, the subject matter of Example 15 optionally includes a machine-readable storage medium including instructions that cause the mobile device to perform acts including initiating a request to a verification device for access credential information of the user, and decoding the access credential information received in response to the request.

In Example 17, the subject matter of one or both of Examples 14 and 15 optionally includes a machine-readable storage medium including instructions that cause the mobile device to perform acts including receiving the identification of the physical access port in a Bluetooth low energy (BLE) signal.

In Example 18, the subject matter of one or any combination of Examples 15-17 optionally includes a machine-readable storage medium including instructions that cause the mobile device to perform acts including receiving the identification of the physical access port in encrypted information received using near field communication (NFC).

In Example 19, the subject matter of Example 18 optionally includes a machine-readable storage medium including instructions that cause the mobile device to perform acts including comparing an access token for the physical access portal stored in the mobile device to a revocation list of invalid access tokens.

In Example 20, the subject matter of one or both of Examples 18 and 19 optionally includes a machine-readable storage medium including instructions that cause the mobile device to perform acts including presenting a notification of a verification application on a display screen of the mobile device, wherein the verification application initiates sending the encrypted access token to the secure relay device; starting execution of the application in response to contact detected using the display screen; and initiating a request for the identification of the physical access port using the verification application.

In Example 21, the subject matter of one or any combination of Examples 15-20 optionally includes a machine-readable storage medium including instructions that cause the mobile device to perform acts including retrieving a cryptography key from a secure element or a trusted execution environment of the mobile device.

These non-limiting Examples can be combined in any permutation or combination. The above detailed description includes references to the accompanying drawings, which form a part of the detailed description. The drawings show, by way of illustration, specific embodiments in which the invention can be practiced. The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A method of operating an access control system, the method comprising:

receiving, by a mobile device, an identification of a physical access portal;

establishing, by a verification application of the mobile device, a secure communication channel with a secure relay device using out of band signaling, wherein the secure relay device is local to the physical access portal and controls access to the physical access portal local to the secure relay device;

sending, by the verification application of the mobile device, an encrypted access token pre-stored in the mobile device prior to establishing the secure communication channel to the secure relay device using the secure communication channel and out of band signaling; and decrypting, by the secure relay device, the encrypted access token;

comparing the access token to a revocation list of access tokens that are invalid for the secure relay device for the physical access portal; and granting access by the secure relay device to the physical access portal according to information stored in the encrypted access token.

2. The method of claim 1, wherein the encrypted access token comprises a cryptographic signature taken over an access token identifier and one or more of a mobile device identifier, a secure relay device identifier, an access start time for the physical access portal, and an access expiration time for the physical access portal.

3. The method of claim 1, comprising:

initiating, by the verification application of the mobile device, a request for status to a verification device different from the secure relay device for access credential information of a user of the mobile device;

receiving a response to the request; and including the response to the request in the information stored in the encrypted access token sent to the secure relay device.

4. The method of claim 1, wherein receiving the identification of the physical access portal comprises reading cryptographically protected information from a near field communications (NFC) tag that identifies the physical access portal.

5. The method of claim 4, wherein the verification application of the mobile device begins executing in response to the reading the cryptographically protected information from the NFC tag.

6. The method of claim 4, comprising:

presenting a notification of the verification application on a display screen of the mobile device;

starting execution of the verification application in response to detecting contact with the display screen; and reading the cryptographically protected information from the NFC tag after the verification application is started.

7. The method of claim 1, wherein receiving the identification of the physical access portal comprises receiving the identification of the physical access portal in a beacon signal.

8. The method of claim 1, comprising:

establishing a secure communication channel between the secure relay device and a time server;

synchronizing a real time clock circuit of the secure relay device with the time server using the secure communication channel; and granting access by the secure relay device to the physical access portal further according to a time policy and a time determined by the real time clock circuit.

9. A secure relay device of an access control system, the device comprising:

memory storing a revocation list of access tokens that are invalid only for the secure relay device for the physical access portal;

physical layer circuitry configured to receive information wirelessly; and processing circuitry operatively coupled to the physical layer circuitry and configured to:

control access to a physical access portal local to the secure relay device;

decode first authentication information received wirelessly from a mobile device using out of band signaling that is out of band of the mobile device;

encode second authentication information for sending to the mobile device to establish a secure communication channel with the mobile device using the out of band signaling;

decrypt an access token received from the mobile device via the secure communication channel using the out of band signaling in response to the second authentication information;

determine validity of the access token by comparing the access token to the revocation list for the secure relay device; and grant access to the physical access portal according to the access token.

10. The device of claim 9, comprising a secure element configured to store one or more cryptography keys.

11. The device of claim 9, comprising:

a real time clock circuit coupled to the processing circuitry; and wherein the processing circuitry is configured to:

establish a secure communication channel with a time server;

synchronize the real time clock circuit with the time server via the secure communication channel; and grant access by the secure relay device to the physical access portal according to the access token, a time policy, and a time determined by the real time clock circuit.

12. The device of claim 11, comprising a super-capacitor coupled to the real time clock circuit to power the real time clock circuit.

13. The device of claim 11, wherein the physical layer circuitry is configured to transmit a beacon signal readable by the mobile device.

14. The device of claim 9, wherein the access token comprises an access token identifier, a mobile device identifier, and a secure relay device identifier.

15. A machine-readable storage medium comprising instructions that, when executed by processing circuitry of a mobile device, cause the mobile device to perform acts comprising:

receiving an identification of a physical access portal;

comparing an access token for the physical access portal stored in the mobile device to a revocation list of invalid access tokens;

exchanging authentication information with a secure relay device local to the physical access portal and establishing a secure communication channel with the secure relay device using out of band signaling; and sending an encrypted access token to the secure relay device using the secure communication channel and out of band signaling.

16. The machine-readable storage medium of claim 15, further comprising instructions that cause the mobile device to perform acts comprising:

initiating a request to a verification device different from the secure relay device for access credential information of a user of the mobile device; and decoding the access credential information received in response to the request; and including the response to the request in the information stored in the encrypted access token sent to the secure relay device.

17. The machine-readable storage medium of claim 15, further comprising instructions that cause the mobile device to perform acts comprising receiving the identification of the physical access port in a Bluetooth low energy (BLE) signal.

18. The machine-readable storage medium of claim 15, further comprising instructions that cause the mobile device to perform acts comprising receiving the identification of the physical access port in encrypted information received using near field communication (NFC).

19. The machine-readable storage medium of claim 18, further comprising instructions that cause the mobile device to perform acts comprising:

presenting a notification of a verification application on a display screen of the mobile device, wherein the verification application initiates sending the encrypted access token to the secure relay device;

starting execution of the application in response to contact detected using the display screen; and initiating a request for the identification of the physical access port using the verification application.

20. The machine-readable storage medium of claim 15, further comprising instructions that cause the mobile device to perform acts comprising:

receiving the identification of the physical access portal using a beacon signal;

determining intent of the user to access the physical access portal using the beacon signal; and establishing the secure communication channel with the secure relay device in response to determining the intent.

* * * * *